US011266999B2

(12) United States Patent
Takahashi et al.

(10) Patent No.: US 11,266,999 B2
(45) Date of Patent: Mar. 8, 2022

(54) DUST-COLLECTING APPARATUS

(71) Applicant: NuFlare Technology, Inc., Yokohama (JP)

(72) Inventors: Yosuke Takahashi, Yokohama (JP); Yuji Abe, Yokohama (JP); Kiminobu Akeno, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 608 days.

(21) Appl. No.: 16/177,615

(22) Filed: Nov. 1, 2018

(65) Prior Publication Data

US 2019/0126290 A1 May 2, 2019

(30) Foreign Application Priority Data

Nov. 2, 2017 (JP) ............................. JP2017-212783

(51) Int. Cl.

*B01D 53/02* (2006.01)
*B03C 3/47* (2006.01)
*B03C 3/86* (2006.01)
*B03C 3/68* (2006.01)
*B08B 6/00* (2006.01)

(52) U.S. Cl.

CPC .................. *B03C 3/47* (2013.01); *B03C 3/68* (2013.01); *B03C 3/86* (2013.01); *B03C 2201/28* (2013.01); *B08B 6/00* (2013.01)

(58) Field of Classification Search

CPC ......... B03C 2201/28; B03C 3/47; B03C 3/68; B03C 3/86; B08B 6/00

See application file for complete search history.

(56) References Cited

U.S. PATENT DOCUMENTS

2006/0130658 A1 6/2006 Chang et al.
2010/0044559 A1* 2/2010 Senko .................. H01J 49/061 250/282
2011/0162526 A1* 7/2011 Tatsumi .................... B03C 3/64 96/58

(Continued)

FOREIGN PATENT DOCUMENTS

CN 202700651 U 1/2013
JP 58-53829 A 3/1983
JP 2002-110515 A 4/2002

(Continued)

OTHER PUBLICATIONS

Office Action dated Apr. 6, 2021 in corresponding Japanese Patent Application No. 2017-212783 (with English Translation), 4 pages.

(Continued)

*Primary Examiner* — Christopher P Jones
(74) *Attorney, Agent, or Firm* — Olon, McClelland, Maier & Neustadt, L.L.P.

(57) ABSTRACT

According to one embodiment, a dust-collecting apparatus includes a main body with a first surface on which a back surface of a first electrode is disposed; a fixing unit configured to control attachment and detachment of the first electrode and the main body; a second electrode configured to transfer a voltage to the first electrode; and a control board configured to control a magnitude and a timing of a voltage which is applied to the second electrode.

6 Claims, 10 Drawing Sheets

(56) References Cited

U.S. PATENT DOCUMENTS

| | | | |
|---|---|---|---|
| 2016/0207051 A1 | 7/2016 | Tatsumi et al. | |
| 2018/0211850 A1* | 7/2018 | Kondoh | H01L 21/67766 |

FOREIGN PATENT DOCUMENTS

| | | |
|---|---|---|
| JP | 3598265 | 12/2004 |
| TW | 200624177 A | 7/2006 |
| TW | 201521878 A | 6/2015 |

OTHER PUBLICATIONS

Combined Taiwanese Office Action and Search Report dated Dec. 18, 2019 in Taiwanese Patent Application No. 107136254 (with unedited generated English translation), 18 pages.
Chinese Office Action dated Mar. 1, 2021 in Chinese Patent Application No. 201811299642.0 (with unedited computer generated English translation), 11 pages.
Combined Chinese Office Action and Search Report dated Jul. 29, 2020 in corresponding Chinese Patent Application No. 201811299642.0 (with English Translation), 16 pages.

* cited by examiner

DUST-COLLECTING APPARATUS

CROSS-REFERENCE TO RELATED APPLICATIONS

This application is based upon and claims the benefit of priority from prior Japanese Patent Application No. 2017-212783, filed Nov. 2, 2017; the entire contents of which are incorporated herein by reference.

FIELD

Embodiments described herein relate generally to a dust-collecting apparatus.

BACKGROUND

With an increase in integration density and an increase in capacity of semiconductor devices in recent years, the circuit line width required for semiconductor devices has been decreasing more and more. In order to form a desired circuit pattern on a semiconductor device, lithography technology is used. In the lithography technology, a pattern transfer using an original image pattern called "mask (reticle)" is performed. In order to fabricate a high-precision mask for use in the pattern transfer, a charged particle beam drawing apparatus with an excellent resolution is used.

This charged particle beam drawing apparatus is provided with a drawing chamber which accommodates a stage on which a sample such as a mask or a blank is placed, a robot chamber which accommodates a robot device for transferring the sample, and a load-lock chamber for transferring in and out the sample. Normally, these chambers are kept in a vacuum state. The sample is transferred by the robot device from the load-lock chamber into the drawing chamber via the robot chamber. After drawing, the sample is transferred out of the drawing chamber, and returned to the load-lock chamber via the robot chamber. When a pattern is drawn, a charged particle beam is deflected and radiated on a predetermined location of the sample on the stage while the stage, on which the sample is placed, is being moved, and the patter is drawn on the sample on the stage.

For various reasons, there is a case in which dust (e.g. impurities such as a contaminant) exists in the charged particle beam drawing apparatus. If dust exists in the charged particle beam drawing apparatus, the dust may adhere to the sample while the sample is being transferred or at a time of drawing. For example, if dust adheres to the sample before drawing, defective drawing occurs due to the dust. In this manner, the adhesion of dust is a factor of degradation of the sample, i.e. degradation of the quality of products. Thus, there is a demand for suppression of the degradation of the quality of products due to the adhesion of dust. On the other hand, in order to clean the dust in the apparatus, it is necessary to clean mechanisms in the apparatus by breaking the vacuum in the apparatus. However, a great deal of time is needed to draw the vacuum in the charged particle beam drawing apparatus. In addition, after the vacuum is drawn in the charged particle beam drawing apparatus, it is necessary to adjust an electronic optical system in the charged particle beam drawing apparatus. Thus, a time (down-time) in which the charged particle beam drawing apparatus is unable to operate becomes longer. Due to the down-time, it is possible that the yield lowers. With the lowering of the yield, it is possible that the cost for fabricating masks increases. Therefore, there is a demand for the reduction in the occurrence of down-time in the apparatus due to dust.

DETAILED DESCRIPTION

In general, according to one embodiment, a dust-collecting apparatus includes a main body with a first surface on which a back surface of a first electrode is disposed; a fixing unit configured to control attachment and detachment of the first electrode and the main body; a second electrode configured to transfer a voltage to the first electrode; and a control board configured to control a magnitude and a timing of a voltage which is applied to the second electrode.

Hereinafter, embodiments will be described in detail with reference to the accompanying drawings. In the description below, common parts are denoted by like reference signs throughout the drawings.

It should be noted that the drawings are schematic ones, and the relationship between a thickness and a planar dimension, the ratio in thickness between layers, etc. are different from real ones. Thus, concrete thicknesses and dimensions should be judged in consideration of descriptions below. In addition, needless to say, the drawings include parts with mutually different relations or ratios of dimensions.

Each of functional blocks can be realized as hardware, computer software, or a combination of both. Thus, each block will be described below, in general, from the standpoint of the function thereof, so as to make it clear that each block is any one of hardware, computer software, or a combination of both. Whether such a function is implemented as hardware or implemented as software depends on design restrictions which are imposed on a specific embodiment or the entire system. A person skilled in the art may realize these functions by various methods in each of specific embodiments, and to determine such realization is within the scope of the present invention.

Hereinafter, in each embodiment, a description is given of a dust-collecting apparatus which cleans (eliminates) dust in a semiconductor manufacturing apparatus (charged particle beam drawing apparatus) which is an apparatus of a target of cleaning.

<1> First Embodiment

<1-1> Configuration

<1-1-1> Dust-Collecting Apparatus

Figure 1:
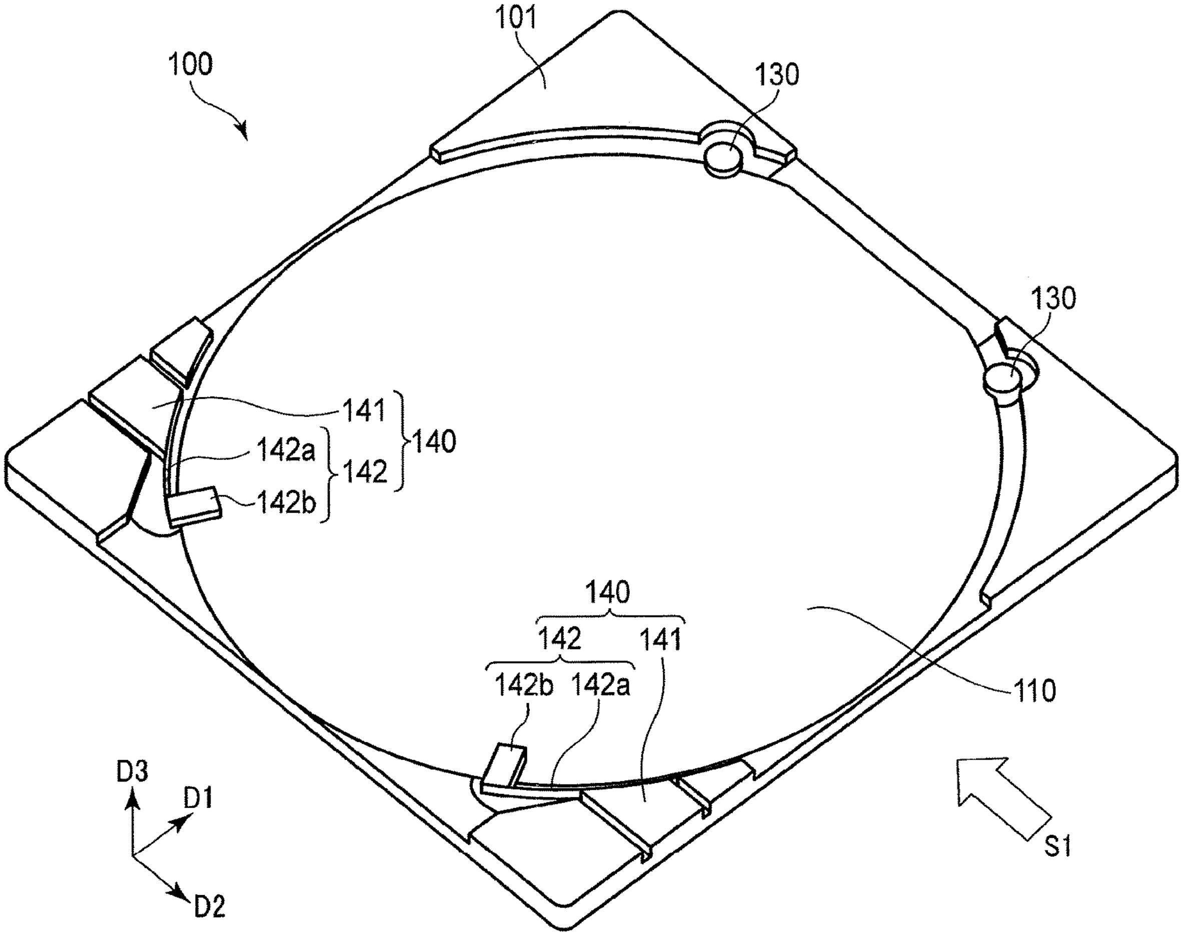
FIG. 1 is a perspective view of a dust-collecting apparatus according to a first embodiment.
Figure 2:
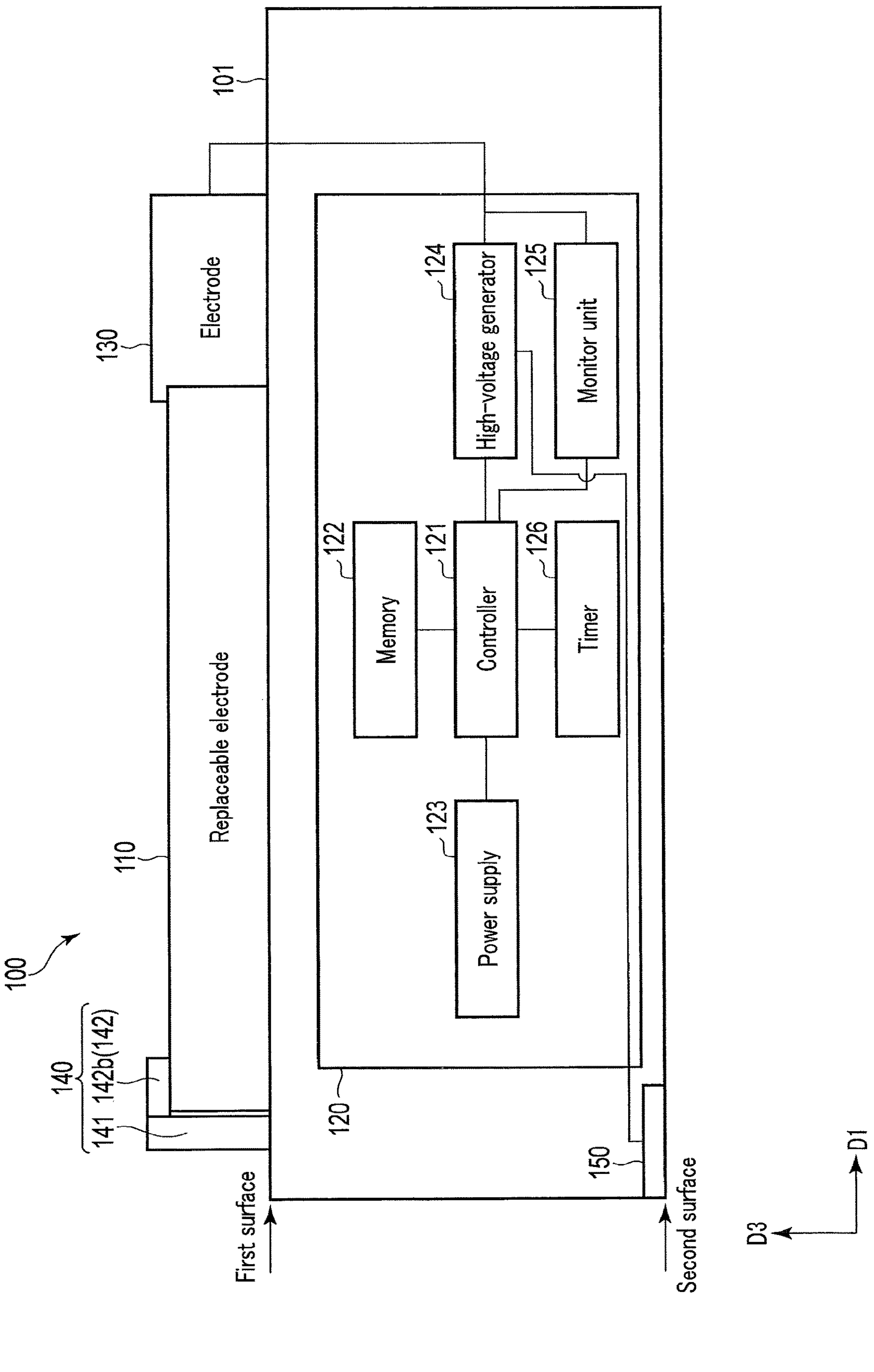
FIG. 2 is a view illustrating the dust-collecting apparatus, as viewed from an S1 direction in FIG. 1.

Referring to FIG. 1 and FIG. 2, a configuration of a dust-collecting apparatus according to a first embodiment will be described. FIG. 1 is a perspective view of the dust-collecting apparatus according to the first embodiment. FIG. 2 is a view illustrating the dust-collecting apparatus, as viewed from an S1 direction in FIG. 1. Note that FIG. 2 represents parts of the dust-collecting apparatus as functional blocks.

The configuration of a dust-collecting apparatus 100 is described. As illustrated in FIG. 1 and FIG. 2, in the dust-collecting apparatus 100, a back surface of a replaceable electrode (dust-collecting unit) 110 is disposed on a first surface (a plane defined by a D1 direction and a D2 direction) of a main body 101. In addition, the replaceable electrode 110 is mechanically fixed to the first surface of the main body 101 by electrodes 130 and fixing units 140 (base portions 141, support portions 142) provided on the first surface of the dust-collecting apparatus 100. The fixing unit 140 includes a base portion 141 disposed at an end portion of the first surface, and a support portion 142 which is connected to the base portion 141 and supports a front surface (a surface opposed to the back surface) of the replaceable electrode 110. The support portion 142 includes a first support portion 142*a* and a second support portion 142*b*. The first support portion 142*a* has, for example, a plate-shaped structure along a region where the replaceable electrode 110 is disposed, and one end of the first support portion 142*a* is fixed to the base portion 141. The second support portion 142*b* has, for example, a box-shaped structure, and is provided at the other end of the first support portion 142*a*. The first support portion 142*a* is, for example, a plate spring, and has such a properly as to be deformed by application of force and to be restored by the release of the force. In the state in which no force is applied to the first support portion 142*a*, the second support portion 142*b* is disposed on the first surface of the main body 101 in a manner to fix the replaceable electrode 110. When the replaceable electrode 110 is to be fixed on the first surface of the main body 101, the fixation becomes possible by applying force to the first support portion 142*a* and displacing the second support portion 142*b* from the region where the replaceable electrode 110 is disposed. Specifically, by moving the support portion 142, the replaceable electrode 110 can be attached/detached to/from the first surface of the main body 101. Note that the outer shape of the first surface of the main body 101 is, for example, substantially equal to that of a sample on which drawing is performed. In other words, the outer shape of the surface parallel to the D1 direction and D2 direction of the dust-collecting apparatus 100 is substantially equal to that of the sample on which drawing is performed. In FIG. 1, the replaceable electrode 110 is fixed to the first surface of the main body 101 by two electrodes 130 and two fixing units 140, but the embodiment is not limited to this. Specifically, the number of electrodes 130 and the number of fixing units 140 can be changed as needed.

The replaceable electrode 110 is an electrically conductive substrate. For example, the replaceable electrode 110 is a silicon substrate which is processed to have substantially the same shape as a sample on which drawing is performed. By a voltage being applied to the replaceable electrode 110 via the electrodes 130, the replaceable electrode 110 is electrified. Mutually attracting electrostatic forces act between the replaceable electrode 110 in the electrified state and dust. Thereby, the dust is adsorbed on the front surface (the surface opposed to the back surface) of the replaceable electrode 110. In addition, since a potential is retained on the front surface of the replaceable electrode 110 in the electrified state, the dust, which is adsorbed on the front surface of the replaceable electrode 110, remains adsorbed on the front surface of the replaceable electrode 110 by the electrostatic force.

As illustrated in FIG. 2, the main body 101 includes a control board 120. Circuits are formed on the control board 120, and the control board 120 includes a controller 121, a memory 122, a power supply 123, a high-voltage generator 124, a monitor unit 125 and a timer 126, which are realized by the circuits.

The controller 121 controls the memory 122, power supply 123, high-voltage generator 124, monitor unit 125 and timer 126.

The memory 122 stores various kinds of information. Examples of the information stored in the memory 122 include setting information for causing the high-voltage generator 124 to generate voltage, information relating to discharging, and the like. The memory 122 is, for example, a nonvolatile storage device. A user of the dust-collecting apparatus can record desired setting information in the memory 122. In addition, the memory 122 stores various physical quantities in the dust-collecting apparatus 100 during the operation of the dust-collecting apparatus 100. By referring to the physical quantities via the memory 122, the user can confirm, for example, the presence/absence of discharge by the replaceable electrode 110, and the number of times of discharge by the replaceable electrode 110.

The power supply 123 is a power supply which is necessary for enabling the respective structural components of the dust-collecting apparatus 100 to operate. The power supply 123 is, for example, a battery or the like.

The high-voltage generator 124 generates a high voltage, based on power which is supplied from the power supply 123, and supplies the high voltage to the electrodes 130. The electrodes 130 transfer the voltage from the high-voltage generator 124, and thereby the replaceable electrode 110 is electrified and dust is adsorbed on the replaceable electrode 110. The high-voltage generator 124 is, for example, a Cockcroft-Walton circuit, or a boost circuit using a piezoelectric transformer.

The monitor unit 125 monitors an output of voltage from the high-voltage generator 124, and electric current flowing in the dust-collecting apparatus 100. The monitor unit 125 compares the value of current with, for example, a current value for discharge determination, which is stored in the memory 122. Then, if the monitor unit 125 determines that a current over the current value for discharge determination is flowing, the monitor unit 125 stops, via the controller 121, the voltage generation by the high-voltage generator 124. Thereby, discharge can be suppressed. Although the controller 121 and monitor unit 125 are described here as separate structural components, the controller 121 and monitor unit 125 may be one integral component as hardware.

The timer 126 measures time in response to an instruction of the controller 121. Then, based on a time instant measured by the timer 126, the controller 121 controls the voltage generation by the high-voltage generator 124.

In addition, as illustrated in FIG. 2, a ground unit 150 is provided on a second surface which is opposed to the first surface of the main body 101. The ground unit 150 is connected to a ground unit in an apparatus (e.g. charged particle beam drawing apparatus) into which the dust-collecting apparatus 100 is transferred. Thereby, the dust-collecting apparatus 100 can share, via the ground unit 150, a ground voltage of the apparatus into which the dust-collecting apparatus 100 is transferred. The high-voltage generator 124 shares the ground voltage, obtained via the ground unit 150, of the apparatus into which the dust-collecting apparatus 100 is transferred. Thus, the high-voltage generator 124 can generate voltage with reference to the ground voltage of the apparatus into which the dust-collecting apparatus 100 is transferred. As a result, the replaceable electrode 110 is electrified to a predetermined potential, and cleaning can be performed. Note that the number of ground units 150, which are disposed on the second surface of the main body 101, can be changed as needed.

<1-1-2> Charged Particle Beam Drawing Apparatus

Figure 3:
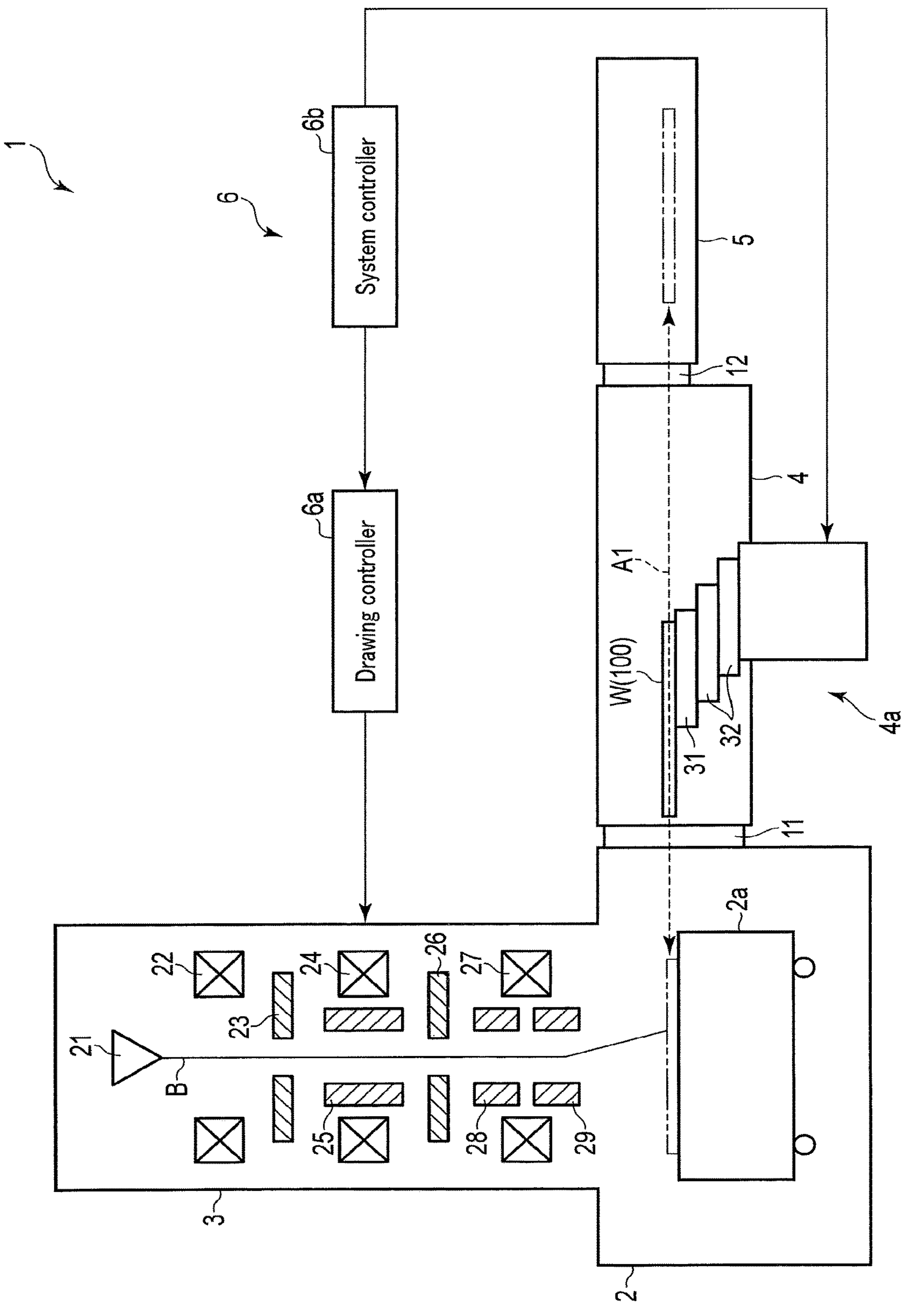
FIG. 3 is a view schematically illustrating a configuration of a charged particle beam drawing apparatus into which the dust-collecting apparatus according to the first embodiment is transferred.

As described above, the dust-collecting apparatus according to the present embodiment is transferred, for example, into the charged particle beam drawing apparatus. Here, referring to FIG. 3, a configuration of the charged particle beam drawing apparatus, into which the dust-collecting apparatus according to the present embodiment is transferred, is described. FIG. 3 is a view schematically illustrating the configuration of the charged particle beam drawing apparatus. This charged particle beam drawing apparatus is an example of a variable formation-type drawing apparatus using, for example, an electron beam as the charged particle beam. Note that the charged particle beam is not limited to the electron beam, and the charged particle beam drawing apparatus may be a general semiconductor manufacturing apparatus such as a process apparatus.

As illustrated in FIG. 3, a charged particle beam drawing apparatus 1 includes a drawing chamber 2 which accommodates a stage 2*a* that supports a sample W of a target of drawing; an optical lens-barrel 3 which radiates an electron beam B on the sample W on the stage 2*a;* a robot chamber 4 which accommodates a robot device 4*a* for transferring the sample W; a load-lock chamber 5 for transferring in/out the sample W; and a control device 6 which controls the respective components. Note that the insides of the drawing chamber 2, optical lens-barrel 3 and robot chamber 4 are normally kept in a vacuum state. In addition, a gate valve 11 is provided between the drawing chamber 2 and robot chamber 4, and a gate valve 12 is provided between the robot chamber 4 and load-lock chamber 5.

The drawing chamber 2 is a drawing chamber accommodating the stage 2*a* on which the sample W of a target of drawing is placed. The drawing chamber has airtightness and functions as a vacuum chamber. The stage 2*a* in the drawing chamber 2 is formed to be movable by a moving mechanism in an X-axis direction and a Y-axis direction which are perpendicular to each other in a horizontal plane. A sample W such as a mask is placed on a placement surface of the stage 2*a*.

The optical lens-barrel 3 is a lens-barrel which is provided above the drawing chamber 2 and which communicates with the inside of the drawing chamber 2. The optical lens-barrel 3 forms and deflects an electron beam B by a charged particle optical system, and radiates the electron beam B on the sample W on the stage 2*a* in the drawing chamber 2. This optical lens-barrel 3 includes a beam emission unit 21 such as an electro gun, which emits the electron beam B; an illumination lens 22 which converges the electron beam B; a first aperture 23 for beam formation; a projection lens 24 for projection; a forming deflector 25 for beam formation; a second aperture 26 for beam formation; an objective lens 27 which forms a beam focal point on the sample W; and a sub-deflector 28 and a main deflector 29 for controlling a beam shot position on the sample W.

In this optical lens-barrel 3, the electron beam b is emitted from the beam emission unit 21, and the electron beam B is radiated on the first aperture 23 by the illumination lens 22. The first aperture 23 has, for example, a rectangular opening. Thereby, if the electron beam B passes through the first aperture 23, the cross-sectional shape of the electron beam B is formed to be rectangular, and the electron beam B is radiated on the second aperture 26 by the projection lens 24. The forming deflector 25 can deflect the position of projection. By changing the position of projection, the forming deflector 25 can control the shape and dimensions of the electron beam B. Then, the focal point of the electron beam B, which has passed through the second aperture 26, is made to agree with the sample W on the stage 2*a* by the objective lens 27, and the electron beam B is radiated on the sample W. At this time, the sub-deflector 28 and main deflector 29 can deflect the shot position of the electron beam B on the sample W on the stage 2*a*.

The robot chamber 4 is provided at a position neighboring the drawing chamber 2, and is connected to the neighboring drawing chamber 2 via the gate valve 11. The robot chamber 4 has airtightness and functions as a vacuum chamber (transfer chamber) which accommodates the robot device 4*a* that transfers the sample W. The robot device 4*a* includes a robot hand 31 and robot arms 32, which hold and move the sample W, and functions as a transfer device which transfers the sample W between neighboring chambers.

An alignment chamber (not shown) for aligning the sample W and a set chamber (not shown) for setting an earth body (substrate cover) on the sample W are connected to the robot chamber 4. The earth body includes a frame of a frame shape (picture frame shape), which covers a peripheral portion of an upper surface of the sample W, and a plurality of earth pins. In the state in which the earth body is set on the upper surface of the sample W, the earth body captures electrons scattered near the peripheral portion of the sample W during drawing, and prevents electrification of the peripheral portion of the sample W.

The load-lock chamber 5 is provided at a position neighboring the robot chamber 4 on the side opposite to the drawing chamber 2. The load-lock chamber 5 is connected to the robot chamber 4 via the gate valve 12. The load-lock chamber 5 has airtightness and functions as a vacuum chamber which provides a space for standby of the sample W. The pressure in the load-lock chamber 5 is controlled at a vacuum pressure, which is substantially equal to the vacuum pressure in the drawing chamber 2, optical lens-barrel 3 and robot chamber 4, and at an atmospheric pressure. Specifically, by utilizing the load-lock chamber 5, the ambient atmosphere in which the sample W is placed can be switched between a vacuum atmosphere and an air atmosphere. The load-lock chamber 5 prevents the drawing chamber 2, optical lens-barrel 3 and robot chamber 4 from opening to the air, and keeps the insides of the drawing chamber 2, optical lens-barrel 3 and robot chamber 4 in the vacuum state.

The control device 6 includes a drawing controller 6*a* which controls the respective parts relating to the drawing, and a system controller 6*b* which controls the entirety of the system. Note that when drawing is performed by the electron beam B, shot data for drawing is input to the drawing controller 6*a*. The shot data is data in which a drawing pattern defined by drawing data is divided into a plurality of stripe areas (the longitudinal direction is the X-axis direction, and the transverse direction is the Y-axis direction), and each stripe area is divided into many sub-areas in a matrix shape.

When the drawing pattern is drawn on the sample W on the stage 2*a*, the drawing controller 6*a* moves the stage 2*a* in the longitudinal direction (X-axis direction) of the stripe areas and, at the same time, positions the electron beam B at each sub-area by the main deflector 29, based on the shot data, and draws a figure by shooting the electron beam B at a predetermined position of the sub-area by the sub-deflector 28. Thereafter, if the drawing of one stripe area is completed, the drawing controller 6*a* moves the stage 2*a* in the Y-axis direction in a stepwise manner, and performs drawing of the next stripe area. By repeating this operation, the drawing controller 6*a* performs the drawing by the electron beam B over the entire drawing area of the sample W (one example of the drawing operation).

The system controller 6*b* controls the robot device 4*a*, etc., in addition to the drawing controller 6*a*. For example, the system controller 6*b* transmits a drawing start instruction, shot data, etc. to the drawing controller 6*a*, and controls, for example, the supply of voltage for the transfer of the sample W by the robot device 4*a*.

As described above, the outer shape of the dust-collecting apparatus 100 is substantially equal to the outer shape of the sample W. Accordingly, like the sample W, the dust-collecting apparatus 100 can be transferred into the charged particle beam drawing apparatus 1 or can be transferred from the charged particle beam drawing apparatus 1. The dust-collecting apparatus 100 can be transferred into the drawing chamber 2, robot chamber 4, load-lock chamber 5, alignment chamber (not shown) and set chamber (not shown). In addition, the dust-collecting apparatus 100, which is transferred into each chamber, is connected to a ground unit in each chamber at the ground unit 150. Thereby, the dust-collecting apparatus 100 can share the ground voltage of each chamber. Besides, the dust-collecting apparatus 100 may be grounded to the robot device 4*a* via the ground unit 150. Thereby, the dust-collecting apparatus 100 can perform cleaning, even while being transferred.

<1-2> Operation

<1-2-1> Operation of the Charged Particle Beam Drawing Apparatus

Before describing the operation of the dust-collecting apparatus, a description is given of the operation of the charged particle beam drawing apparatus. To start with, a sample W is put in the load-lock chamber 5, and the load-lock chamber 5 is evacuated from an atmospheric state to a vacuum state. If the load-lock chamber 5 enters the vacuum state, the gate valve 12 is opened, and the sample W is transferred by the robot device 4*a* from the load-lock chamber 5 into the alignment chamber that communicates with the robot chamber 4. Thereafter, the gate valve 12 is closed. If the alignment of the sample W is completed in the alignment chamber, the sample W is transferred by the robot device 4*a* from the alignment chamber when there is no need to set the earth body on the sample W (e.g. when no problem arises from the above-described electrification in the peripheral part of the sample W). Then, the gate valve 11 is opened, and the sample W is transferred onto the stage 2*a* in the drawing chamber 2. Thereafter, the gate valve 11 is closed. On the other hand, when there is a need to set the earth body on the sample W, the sample W is transferred by the robot device 4*a* from the alignment chamber into the set chamber which communicates with the robot chamber 4. If the earth body is set on the sample W in the set chamber, the sample W, together with the earth body, is transferred from the set chamber by the robot device 4*a*. Then, the gate valve 11 is opened, and the sample W is transferred onto the stage 2*a* in the drawing chamber 2. Thereafter, the gate valve 11 is closed. If the sample W is placed on the stage 2*a* in this manner, drawing by the electron beam B is performed.

Next, after the completion of the drawing by the electron beam B, the gate valve 11 is opened and the sample W is transferred by the robot device 4*a* from the drawing chamber 2, and transferred into the robot chamber 4. Then, the gate valve 11 is closed. Subsequently, when the earth body is not set on the sample W, the gate valve 12 is opened and the sample W is transferred by the robot device 4*a* from the robot chamber 4 into the load-lock chamber 5, and at last the gate valve 12 is closed. On the other hand, when the earth body is set on the sample W, the sample W is transferred by the robot device 4*a* into the set chamber which communicates with the robot chamber 4. If the earth body is removed from the sample W in the set chamber, the gate valve 12 is opened and the sample W is transferred by the robot device 4*a* from the set chamber into the load-lock chamber 5, and at last the gate valve 12 is closed.

In accordance with this transfer process of the sample W, a transfer path A1 occurs. This transfer path A1 is basically present in an identical horizontal plane. For example, the dust-collecting apparatus 100 is transferred along the transfer path A1.

Each dust-collecting apparatus 100 adsorbs, by static electricity, dust existing in each chamber, dust caused by the drawing by the electron beam B, etc.

In the state in which the drawing chamber 2 and robot chamber 4 are kept in the vacuum state, the dust-collecting apparatus 100 can clean dust.

For example, dust is particles of 10 μm or less. Examples of components of the particles include components of metals and non-metals (e.g. carbon).

<1-2-2> Operation Example of the Dust-Collecting Apparatus

Before describing the operation example of the dust-collecting apparatus, the discharge by the dust-collecting apparatus is described. When the dust-collecting apparatus 100 is transferred into the charged particle beam drawing apparatus 1 that is set in the atmospheric state and the dust-collecting apparatus 100 is evacuated while the replaceable electrode 110 is electrified, it is possible that the dust-collecting apparatus 100 causes vacuum discharge in the charged particle beam drawing apparatus 1. In addition, while the dust-collecting apparatus 100 is being transferred, if the wall surface or the like (structural object) of each chamber of the charged particle beam drawing apparatus 1 approaches the replaceable electrode 110 with the replaceable electrode 110 being electrified, it is possible that the dust-collecting apparatus 100 causes vacuum discharge in the charged particle beam drawing apparatus 1. As a result, it is possible that damage is caused on parts of the charged particle beam drawing apparatus 1, or on the dust-collecting apparatus 100.

In order to eliminate the above possibilities, the dust-collecting apparatus 100 according to the present embodiment discretionarily determines the voltage that is applied to the replaceable electrode 110, or the timing of applying the voltage.

Figure 4:
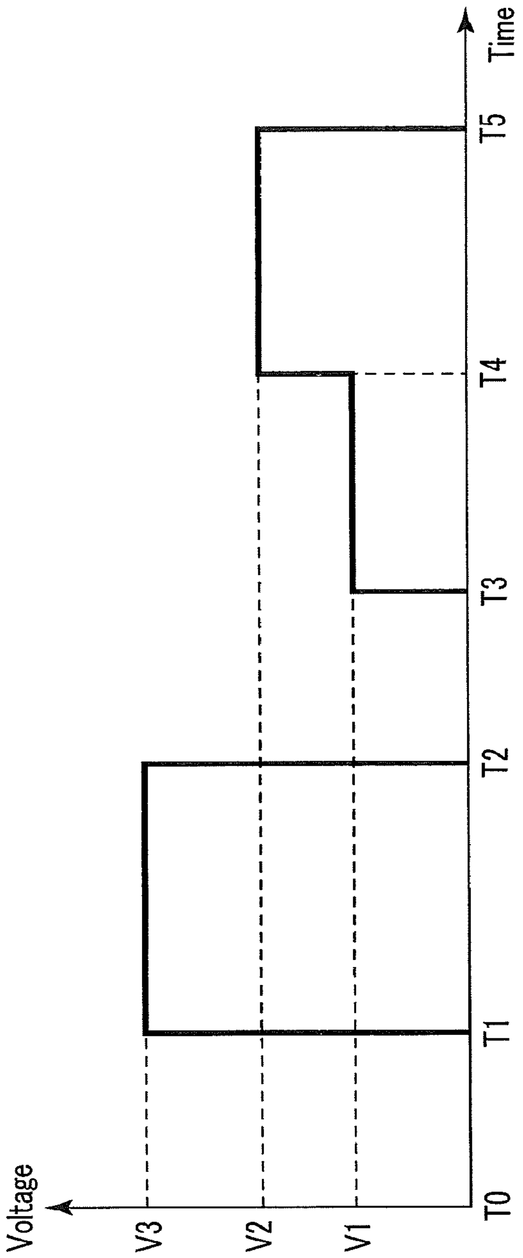
FIG. 4 illustrates an operation example of the dust-collecting apparatus, and shows a relationship between a voltage, which a high-voltage generator applies to a replaceable electrode, and time.

Hereinafter, referring to FIG. 4, an operation example of the dust-collecting apparatus 100 will be described. FIG. 4 illustrates an operation example of the dust-collecting apparatus 100, and shows a relationship between a voltage, which the high-voltage generator 124 applies to the replaceable electrode 110, and time. With reference to FIG. 4, a description is given of the operation in the case in which the dust-collecting apparatus 100 is transferred into the charged particle beam drawing apparatus 1. Note that the operation example illustrated in FIG. 4 is merely an example, and the voltage application timing, voltage value, etc. can be discretionarily set by the user. This setting is stored, for example, in the memory 122.

[Time Instant T0 to time instant T1]

Between time instant T0 and time instant T1 in FIG. 4, the dust-collecting apparatus 100 is transferred into the charged particle beam drawing apparatus 1, which is a target of cleaning, by the same method as the sample W, as described above. For example, information (time instant and voltage value), which indicates that voltage application is prohibited between time instant T0 and time instant T1, is stored in the memory 122. The period between time instant T0 and time instant T1 is a period which is set for avoiding such an accident that discharge occurs during the transfer of the dust-collecting apparatus 100 due to a pressure change or an approach to the charged particle beam drawing apparatus 1.

[Time Instant T1 to time Instant T2]

For example, information (time instant and voltage value), which indicates that a voltage V3 is applied between time instant T1 and time instant T2, is stored in the memory 122. If the controller 121 judges that time instant T1 has come, based on the time measurement of the timer 126, the controller 121 causes the high-voltage generator 124 to generate the voltage V3. Thereby, the voltage V3 is supplied to the electrodes 130, and the replaceable electrode 110 is electrified. As a result, dust is adsorbed on the surface of the replaceable electrode 110.

[Time Instant T2 to Time Instant T3]

When the dust-collecting apparatus 100 passes through a region, such as a gate valve, where the dust-collecting apparatus 100 and a structural component approach each other, it is desirable to stop voltage supply to the replaceable electrode 110.

For example, information (time instant and voltage value), which indicates that voltage application is prohibited between time instant T2 and time instant T3, is stored in the memory 122. If the controller 121 judges that time instant T2 has come, based on the time measurement of the timer 126, the controller 121 causes the high-voltage generator 124 to stop the supply of voltage to the electrode 130. Thereby, discharge from the replaceable electrode 110 can be suppressed.

[Time Instant T3 to Time Instant T4]

When the dust-collecting apparatus 100 is transferred into a region with a vacuum degree at which insulation capability lowers, it is desirable to properly set the voltage supply to the replaceable electrode 110.

For example, information (time instant and voltage value), which indicates that a voltage V1 (V1<V3) is applied between time instant T3 and time instant T4, is stored in the memory 122. If the controller 121 judges that time instant T3 has come, based on the time measurement of the timer 126, the controller 121 causes the high-voltage generator 124 to generate the voltage V1. Thereby, the voltage V1 is supplied to the electrodes 130, and the replaceable electrode 110 is electrified.

[Time Instant T4 to Time Instant T5]

When the dust-collecting apparatus 100 is transferred into a region with a vacuum degree at which insulation capability lowers, although the degree of lowering is less than in the region where the dust-collecting apparatus 100 is passed between time instant T3 and time instant T4, it is desirable to properly set the voltage supply to the replaceable electrode 110.

For example, information (time instant and voltage value), which indicates that a voltage V2 (V1<V2<V3) is applied between time instant T4 and time instant T5, is stored in the memory 122. If the controller 121 judges that time instant T4 has come, based on the time measurement of the timer 126, the controller 121 causes the high-voltage generator 124 to generate the voltage V2. Thereby, the voltage V2 is supplied to the electrodes 130, and the replaceable electrode 110 is electrified.

As described above, the dust-collecting apparatus 100 according to the present embodiment can discretionarily determine the voltage value (magnitude of voltage) that is applied to the replaceable electrode 110, and the timing of applying the voltage.

<1-3> Advantageous Effects

According to the above-described embodiment, in the dust-collecting apparatus 100, the replaceable electrode 110 is disposed on the first surface of the main body 101, and the control board 120 controls the application timing of voltage to the replaceable electrode 110 and the applied voltage value. The dust-collecting apparatus 100 is usable in a vacuum, and the replaceable electrode 110 can be replaced at a discretionarily set timing.

Hereinafter, concrete examples of advantageous effects of the dust-collecting apparatus 100 according to the above-described embodiment will be described.

<1-3-1> Advantageous Effect by the Dust-Collecting Apparatus 100 that can be Transferred into the Semiconductor Manufacturing Apparatus In a semiconductor manufacturing apparatus using a vacuum such as a charged particle beam drawing apparatus, if dust is present in the apparatus, it is possible that the apparatus cannot properly operate.

In order to clean the dust in the apparatus, however, it is necessary to clean mechanisms in the apparatus by breaking the vacuum in the apparatus. A great deal of time is needed to draw the vacuum in the charged particle beam drawing apparatus. In addition, after the vacuum is drawn, it is necessary to adjust an electronic optical system. Thus, a time (down-time) in which the apparatus is unable to operate becomes longer. As a result, it is possible that the yield lowers.

In the meantime, the size of the dust-collecting apparatus 100 according to the above-described embodiment is substantially equal to the size of the sample which is processed in the charged particle beam drawing apparatus. Thus, the dust-collecting apparatus 100 can be transferred like the sample. In addition, the dust-collecting apparatus 100 incorporates the power supply 123 and high-voltage generator 124, and can perform cleaning even in the vacuum. In this manner, since the dust-collecting apparatus 100 is transferred into the apparatus like the sample, the inside of the apparatus can be cleaned without breaking the vacuum in the apparatus. As a result, the down-time of the apparatus can be suppressed, and a decrease in yield can be suppressed.

<1-3-2> Advantageous Effect of the Dust-Collecting Unit that is Replaceable

It is possible to think of a dust-collecting apparatus in which a dust-collecting unit and the main body are integrally formed. In this dust-collecting apparatus, dust is accumulated on the dust-collecting unit and the adsorption efficiency of dust lowers. Thus, before the adsorption efficiency lowers, the dust has to be cleaned from the dust-collecting unit. However, the size of dust adsorbed on the dust-collecting unit is very small, and it is difficult to clean the dust. Consequently, the cleanness of the dust-collecting unit cannot be maintained.

In addition, as the number of times of cleaning of this dust-collecting apparatus increases, the dust is accumulated on the dust-collecting unit, and there is a possibility that an analysis based on the position of collected dust or the kind of collected dust becomes difficult.

However, according to the dust-collecting apparatus 100 of the above-described embodiment, the replaceable electrode 110, which is changeable, is adopted as the dust-collecting unit. The user can change the replaceable electrode 110 to a new replaceable electrode 110 at a discretionarily set timing. Hence, the user does not need to remove dust from the replaceable electrode 110 after cleaning the inside of the semiconductor manufacturing apparatus, and the user may only change the replaceable electrode 110 itself to a new replaceable electrode 110. Thereby, the cleanness of the replaceable electrode 110 can easily be maintained. Accordingly, the decrease in adsorption efficiency of the replaceable electrode 110 can be suppressed, and, as a result, the cleanness in the charged particle beam drawing apparatus can always be kept high. Therefore, even very fine patterns can be formed with a high yield.

In addition, when the user performs an analysis based on the position of collected dust, the kind of collected dust, etc., if the replaceable electrode 110 is removed at a discretionarily set timing, the analysis of the collected dust can properly be performed. By analyzing the collected dust, the user can analyze what kind of dust occurs, and where such dust occurs. Thus, the user can identify, for example, a component in the charged particle beam drawing apparatus 1, which generates the dust. As a result, there is a possibility that the user can discover a fault of the charged particle beam drawing apparatus 1.

Additionally, while analyzing the collected dust adsorbed on the replaceable electrode 110, the user can attach a new replaceable electrode 110 to the main body 101, and can perform cleaning in the semiconductor manufacturing apparatus. In other words, the user can perform cleaning in the semiconductor manufacturing apparatus, without waiting to analyze the collected dust.

Besides, the user can perform cleaning of the dust-collecting apparatus by removing the replaceable electrode 110 after cleaning from the main body 101 and attaching a new replaceable electrode 110 to the main body 101. Thus, the time of cleaning of the dust-collecting apparatus is only a time that is needed for replacing the replaceable electrode 110. As a result, the cleaning time of the dust-collecting apparatus can be decreased to a minimum.

<1-3-1> Advantageous Effect of the Voltage Application that is Controllable

If the inside of the charged particle beam drawing apparatus 1 is evacuated, or if the wall surface or the like of each chamber of the charged particle beam drawing apparatus 1 approaches the replaceable electrode 110, with the replaceable electrode 110 being electrified, it is possible that the dust-collecting apparatus 100 causes vacuum discharge.

However, according to the dust-collecting apparatus 100 of the present embodiment, the controller 121 controls the timing of electrifying the replaceable electrode 110, based on the information stored in the memory 122. The user can set time instants in the memory 122 in accordance with the locations (e.g. the respective chambers of the charged particle beam drawing apparatus) to which the dust-collecting apparatus 100 is transferred. As a result, in the dust-collecting apparatus 100 according to the present embodiment, the replaceable electrode 110 can be prevented from being electrified during the period in which the dust-collecting apparatus 100 is transferred into the charged particle beam drawing apparatus 1 that is set in the atmospheric pressure and the charged particle beam drawing apparatus 1 is then evacuated, or during the period in which the wall surface or the like (structural object) of each chamber of the charged particle beam drawing apparatus 1 approaches the replaceable electrode 110 while the dust-collecting apparatus 100 is being transferred.

Furthermore, according to the dust-collecting apparatus 100 of the present embodiment, the controller 121 can electrify the replaceable electrode 110 with the voltage values stored in the memory 122. The user can set the voltage values in the memory 122, for example, in accordance with the locations to which the dust-collecting apparatus 100 is transferred, and the distance between the replaceable electrode 110 and the structural object in each chamber of the charged particle beam drawing apparatus 1. As a result, even when the wall surface or the like (structural object) of each chamber of the charged particle beam drawing apparatus 1 approaches the replaceable electrode 110, the dust-collecting apparatus 100 of this embodiment can electrify the replaceable electrode 110 to such a degree that no vacuum discharge occurs.

As described above, according to the dust-collecting apparatus 100 of the present embodiment, while vacuum discharge is being suppressed, cleaning can be performed at a discretionarily set timing and a discretionarily set voltage in accordance with a location where dust is to be collected.

<1-3-4> Advantageous Effect of the Grounding to the Charged Particle Beam Drawing Apparatus For example, when the dust-collecting apparatus 100 does not share the ground voltage with the inside of the charged particle beam drawing apparatus 1, there is a possibility that electrification at a predetermined potential cannot be performed, and clearing cannot be carried out. When the ground voltage of the dust-collecting apparatus 100 is different from the ground voltage in the charged particle beam drawing apparatus 1, there is a case in which even if the dust-collecting apparatus 100 applies, for example, a potential of 1 V to the replaceable electrode 110, the potential difference between the charged particle beam drawing apparatus 1 and replaceable electrode 110 becomes 0.5 V. In this case, in the charged particle beam drawing apparatus 1, the replaceable electrode 110 is in the same state as a state in which 0.5 V is substantially applied. Although 1 V is normally applied to the replaceable electrode 110, only 0.5 V is applied. As a result, the replaceable electrode 110 is not electrified at a target potential, and it is possible that cleaning cannot be carried out.

According to the dust-collecting apparatus 100 of the present embodiment, however, the ground voltage in each chamber or the charged particle beam drawing apparatus 1 can be shared via the ground unit 150. Thus, the high-voltage generator 124 can generate voltage with reference to the ground voltage of the charged particle beam drawing apparatus 1. As a result, the replaceable electrode 110 is electrified at a target potential, and cleaning can correctly be carried out.

<1-3-5> Summary of Advantageous Effects

In short, according to the above-described embodiment, there can be provided the dust-collecting apparatus 100 which can clean the inside of the apparatus with a proper voltage, even without breaking the vacuum in the apparatus to which the dust-collecting apparatus 100 is transferred, can easily maintain the cleanness of the dust-collecting unit, can make the analysis of collected dust easier, and can suppress vacuum discharge.

As a result, it is possible to provide a dust-collecting apparatus which can suppress a decrease in product quality due to adhesion of dust.

<2> Second Embodiment

A second embodiment will be described. In the first embodiment, the case was described in which the replaceable electrode is mechanically fixed to the main body. In the second embodiment, a description is given of an example in which the replaceable electrode is electrically fixed to the main body. Note that the basic configuration and basic operation of a dust-collecting apparatus according to the second embodiment are the same as those of the dust-collecting apparatus according to the above-described first embodiment. Accordingly, a description will be omitted of the matters described in the first embodiment and matters which can easily be guessed from the first embodiment.

<2-1> Configuration

Figure 5:
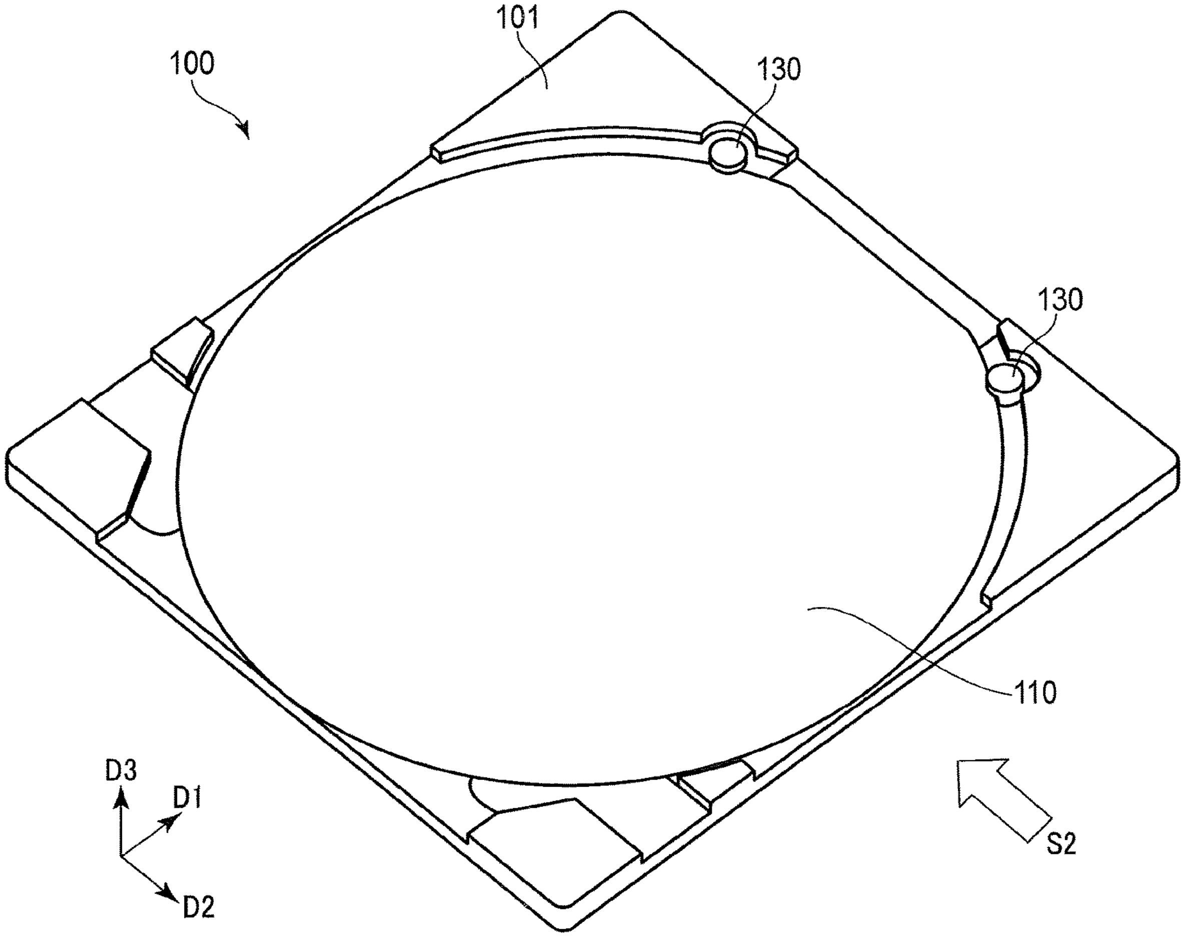
FIG. 5 is a perspective view of a dust-collecting apparatus according to a second embodiment.
Figure 6:
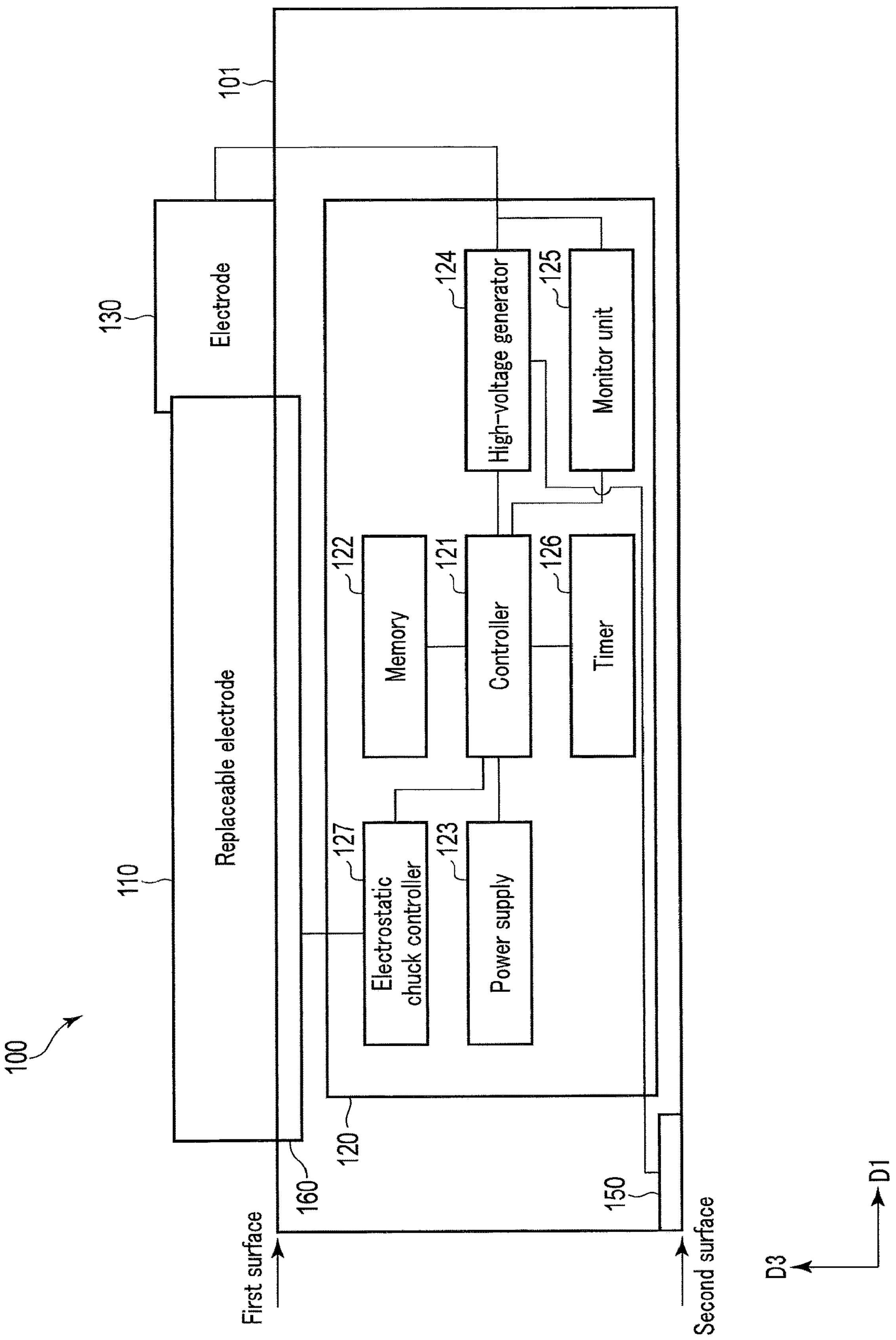
FIG. 6 is a view illustrating the dust-collecting apparatus, as viewed from an S2 direction in FIG. 5.

Referring to FIG. 5 and FIG. 6, a configuration of the dust-collecting apparatus according to the second embodiment will be described. FIG. 5 is a perspective view of the dust-collecting apparatus according to the second embodiment. FIG. 6 is a view illustrating the dust-collecting apparatus, as viewed from an S2 direction in FIG. 5. Note that FIG. 6 represents the dust-collecting apparatus as functional blocks.

The configuration of a dust-collecting apparatus 100 is described. As illustrated in FIG. 5 and FIG. 6, in the dust-collecting apparatus 100, a back surface of a replaceable electrode 110 is disposed on a first surface of a main body 101. In addition, the replaceable electrode 110 is electrically fixed to the first surface of the main body 101 by/a fixing unit (electrostatic chuck unit) 160 provided on the first surface of the dust-collecting apparatus 100. The fixing unit 160 is controlled by an electrostatic chuck controller 127. Specifically, the controller 121 causes the electrostatic chuck controller 127 to generate a voltage for the electrostatic chuck. Then, the voltage for the electrostatic chuck is supplied to the fixing unit 160, and the voltage for the electrostatic chuck is applied to the replaceable electrode 110 via the fixing unit 160. Thereby, the replaceable electrode 110 is electrified, and is fixed to the fixing unit 160 by the electrostatic chuck. When the replaceable electrode 110 is to be removed, the replaceable electrode 110 can be removed by stopping the application of voltage to the replaceable electrode 110.

<2-2> Advantageous Effects

According to the above-described embodiment, the replaceable electrode is electrically fixed to the main body by the electrostatic chuck.

In the case of fixing the replaceable electrode 110 by the electrostatic chuck, compared to the case of mechanically fixing the replaceable electrode 110 as described in the first embodiment, the fixing unit can be simplified, the sliding at a time of fixing the replaceable electrode 110 can be reduced, and the cleanness can be enhanced. In addition, the same advantageous effects as in the first embodiment can be obtained.

At the time of electrostatic chucking, although the replaceable electrode 110 is electrified, such a degree of voltage as not to electrify the surface of the replaceable electrode 110 is applied. Thereby, it is possible to suppress discharge or the like in the apparatus into which the dust-collecting apparatus 100 is transferred.

<3> Third Embodiment

A third embodiment will be described. In the first embodiment, the case was described in which the application of voltage to the replaceable electrode is controlled by using the timer. In the third embodiment, a description is given of an example in which the application of voltage to the replaceable electrode is controlled by the apparatus into which the dust-collecting apparatus is transferred. Note that the basic configuration and basic operation of the dust-collecting apparatus according to the third embodiment are the same as those of the dust-collecting apparatuses according to the above-described first and second embodiments. Accordingly, a description will be omitted of the matters described in the first and second embodiments and matters which can easily be guessed from the first and second embodiments.

<3-1> Configuration

<3-1-1> Dust-Collecting Apparatus

Figure 7:
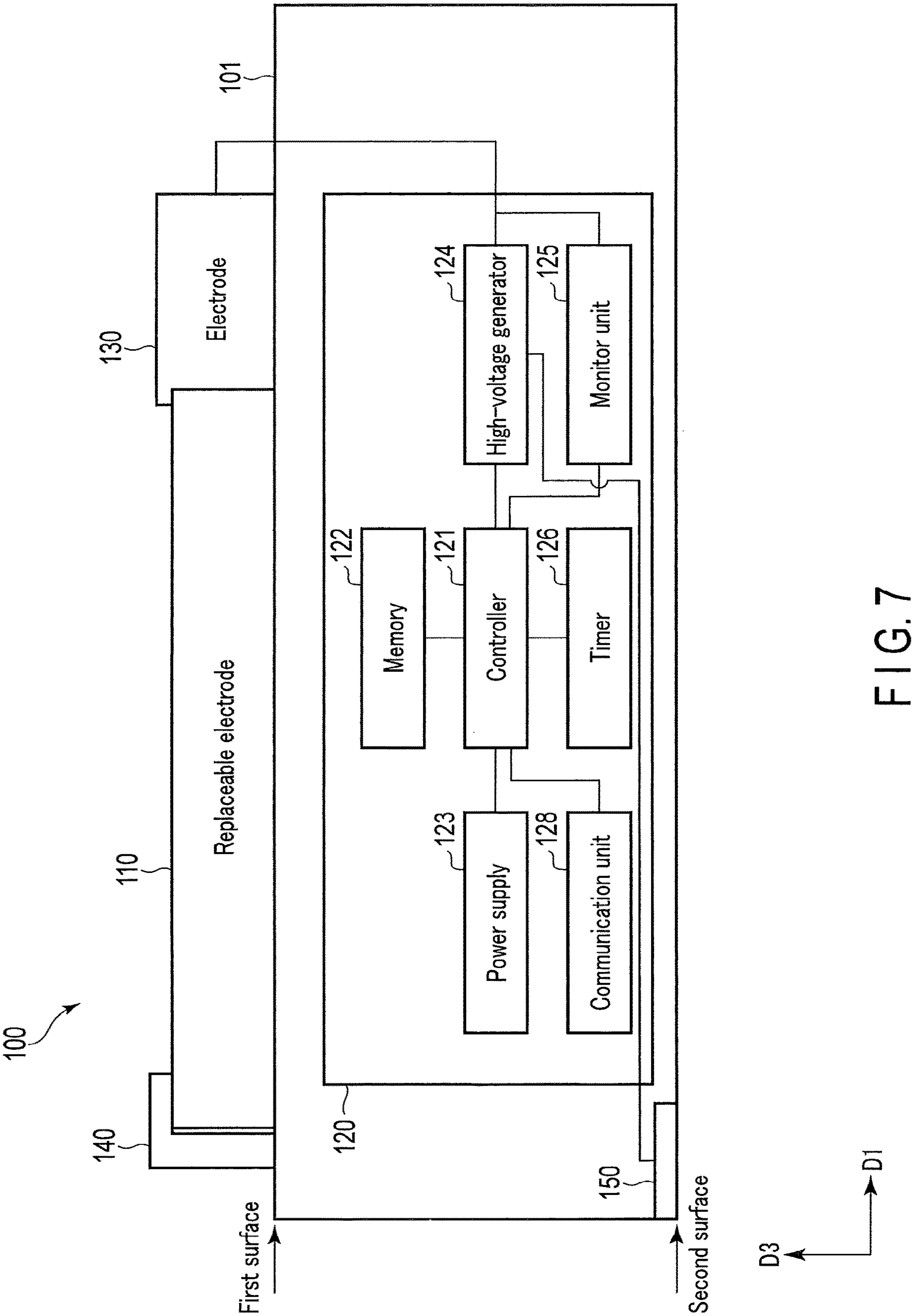
FIG. 7 is a view illustrating a dust-collecting apparatus, as viewed from the S1 direction in FIG. 1.

Referring to FIG. 7, a configuration of the dust-collecting apparatus according to the third embodiment will be described. FIG. 7 is a view illustrating the dust-collecting apparatus, as viewed from the S1 direction in FIG. 1. Note that FIG. 7 represents the dust-collecting apparatus as functional blocks.

As illustrated in FIG. 7, the main body 101 includes a control board 120. The control board 120 includes a controller 121, a memory 122, a power supply 123, a high-voltage generator 124, a monitor unit 125, a communication unit 128 and a timer 126.

The controller 121 controls the memory 122, power supply 123, high-voltage generator 124, monitor unit 125, timer 126 and communication unit 128.

The communication unit 128 can communicate with an external device (e.g. a charged particle beam drawing apparatus, a personal computer, etc.) of the dust-collecting apparatus 100. The communication unit 128 is a communication interface for communicating with the external device. As the communication interface, use is made of an interface which adopts, for example, a near-field wireless data communication standard such as infrared or Bluetooth (trademark). The communication unit 128 transmits information (e.g. information stored in the memory 122) to the external device, and receives information and instructions (signals) from the external device. For example, the information received via the communication unit 128 is stored in the memory 122. In addition, the controller 121 operates, based on instructions received via the communication unit 128.

Specifically, the user can set time instants in the memory 122 from the external device via the communication unit 128, in accordance with a location (e.g. each chamber of the charged particle beam drawing apparatus) to which the dust-collecting apparatus 100 is transferred.

In addition, the user may cause the timer 126 to measure time, by transmitting an instruction from the external device via the communication unit 128.

Besides, the user may control the voltage generation by the high-voltage generator 124, by transmitting an instruction from the external device via the communication unit 128.

<3-1-2> Charged Particle Beam Drawing Apparatus

Figure 8:
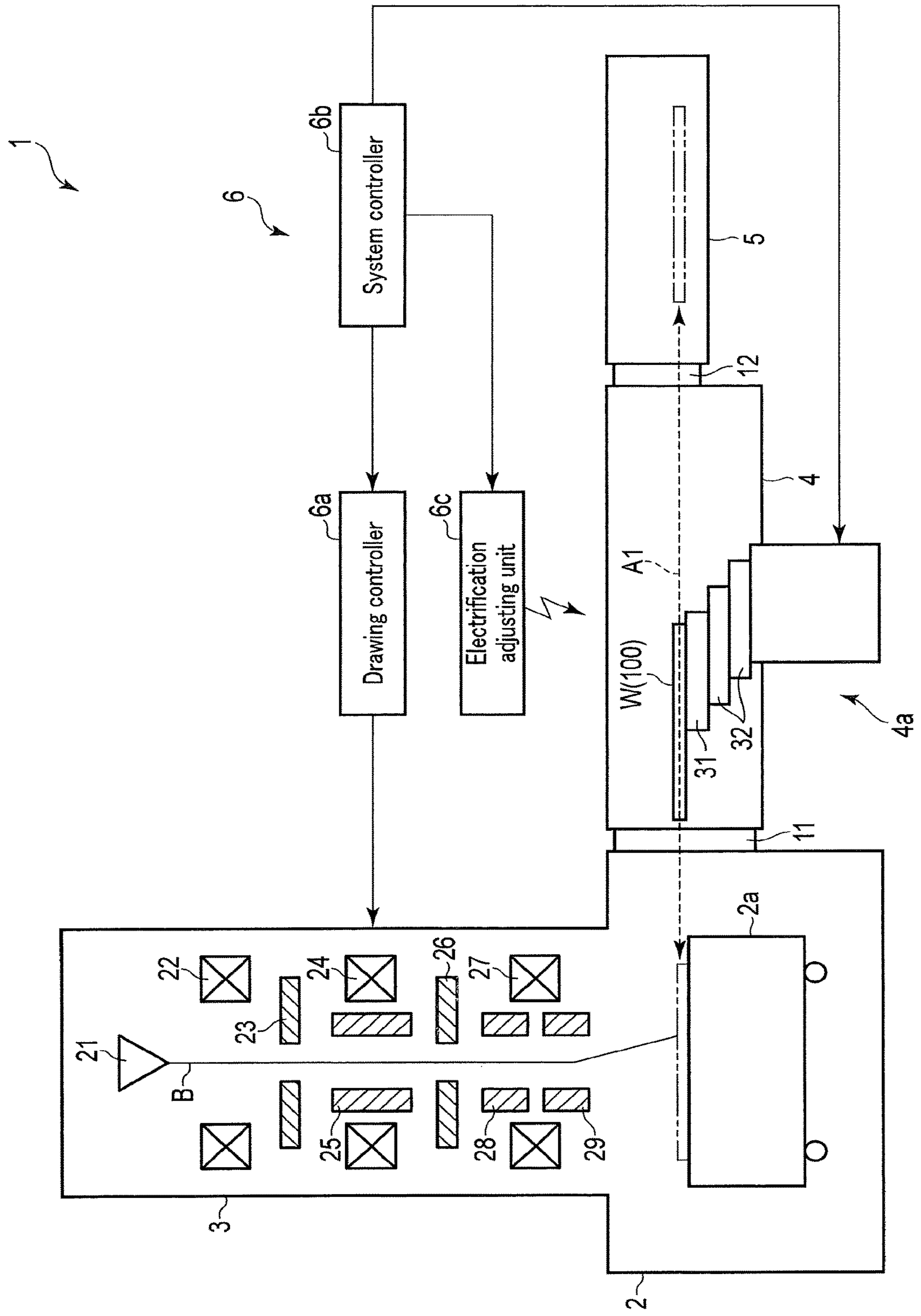
FIG. 8 is a view schematically illustrating a configuration of a charged particle beam drawing apparatus into which a dust-collecting apparatus according to a third embodiment is transferred.

Here, referring to FIG. 8, a description is given of the configuration of the charged particle beam drawing apparatus into which the dust-collecting apparatus is transferred. FIG. 8 is a view schematically illustrating the configuration of the charged particle beam drawing apparatus.

As illustrated in FIG. 8, the charged particle beam drawing apparatus 1 further includes an electrification adjusting unit 6*c*, compared to the charged particle beam drawing apparatus 1 described with reference to FIG. 3.

The electrification adjusting unit 6*c* can transmit information and instructions (signals) to the communication unit 128 of the dust-collecting apparatus 100. The electrification adjusting unit 6*c* includes a communication interface for communicating with the dust-collecting apparatus 100.

<3-2> Operation

<3-2-1> Operation Example 1

Next, an operation example 1 of the dust-collecting apparatus and charged particle beam drawing apparatus is described. Based on instructions received from the electrification adjusting unit 6*c* via the communication unit 128, the controller 121 causes the high-voltage generator 124 to generate voltage. The instructions include an instruction to generate voltage, an instruction relating to the value of voltage to be generated, and the like. In this manner, based on the information received from the charged particle beam drawing apparatus 1, the dust-collecting apparatus 100 can clean the charged particle beam drawing apparatus 1.

<3-2-2> Operation Example 2

Next, an operation example 2 of the dust-collecting apparatus and charged particle beam drawing apparatus is described. A threshold of a vacuum degree is stored in the memory 122 of the dust-collecting apparatus 100. Based on a vacuum degree received from the electrification adjusting unit 6*c* via the communication unit 128, the controller 121 determines whether the vacuum degree has exceeded the threshold stored in the memory 122. If the controller 121 determines that the vacuum degree has exceeded the threshold, the controller 121 causes the high-voltage generator 124 to generate voltage. In this manner, based on the information received from the charged particle beam drawing apparatus 1, the dust-collecting apparatus 100 can clean the charged particle beam drawing apparatus 1.

<3-3> Advantageous Effects

According to the above-described embodiment, the dust-collecting apparatus 100 receives instructions from the semiconductor manufacturing apparatus via the communication unit 128, and cleans the semiconductor manufacturing apparatus.

In this manner, since the dust-collecting apparatus 100 can clean the semiconductor manufacturing apparatus, based on the instructions from the semiconductor manufacturing apparatus, the dust-collecting apparatus 100 can properly perform cleaning.

<4> Modifications

In each of the above-described embodiments, the case was described in which the dust-collecting apparatus 100 is transferred into the charged particle beam drawing apparatus 1. However, the embodiments are not limited to this case. Specifically, the dust-collecting apparatus 100 is applicable to any kind of apparatus if adsorption of dust is needed in the apparatus. In addition, since each of the above-described embodiments was described on the premise that the dust-collecting apparatus 100 is transferred into the charged particle beam drawing apparatus, the size of the dust-collecting apparatus 100 was described as being the same as the size of the sample which is processed in the charged particle beam drawing apparatus. However, when the dust-collecting apparatus 100 is applied to an apparatus which is different from the charged particle beam drawing apparatus, the size and shape of the dust-collecting apparatus 100 may be set to be a size and shape that are applicable to the apparatus which is different from the charged particle beam drawing apparatus. Besides, each of the above-described embodiments was described with respect to the case in which the dust-collecting apparatus 100 collects dust in the vacuum state. However, the dust-collecting apparatus 100 can collects dust in the atmosphere.

Figure 9:
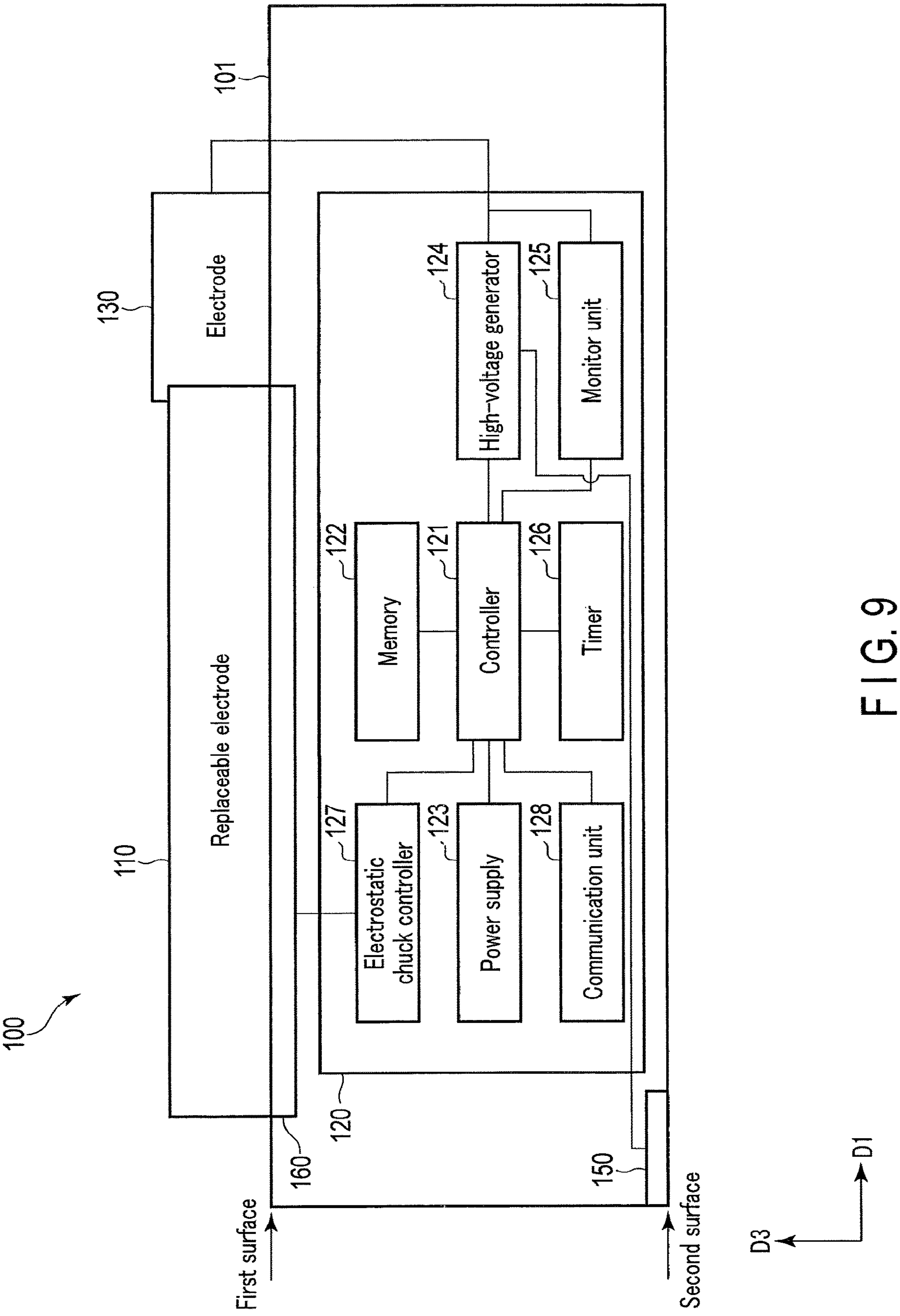
FIG. 9 is a view illustrating a dust-collecting apparatus, as viewed from the S2 direction in FIG. 5.

Additionally, as the dust-collecting apparatus 100 according to the third embodiment, the communication unit 128 can be applied to the dust-collecting apparatus 100 described in the second embodiment. Specifically, as illustrated FIG. 9, the communication unit 128 may be provided in the dust-collecting apparatus 100 which fixes the replaceable electrode 110, not by the fixing unit 140 but by the fixing unit 160. In this case, the advantageous effects of the second embodiment and third embodiment can be obtained.

Figure 10:
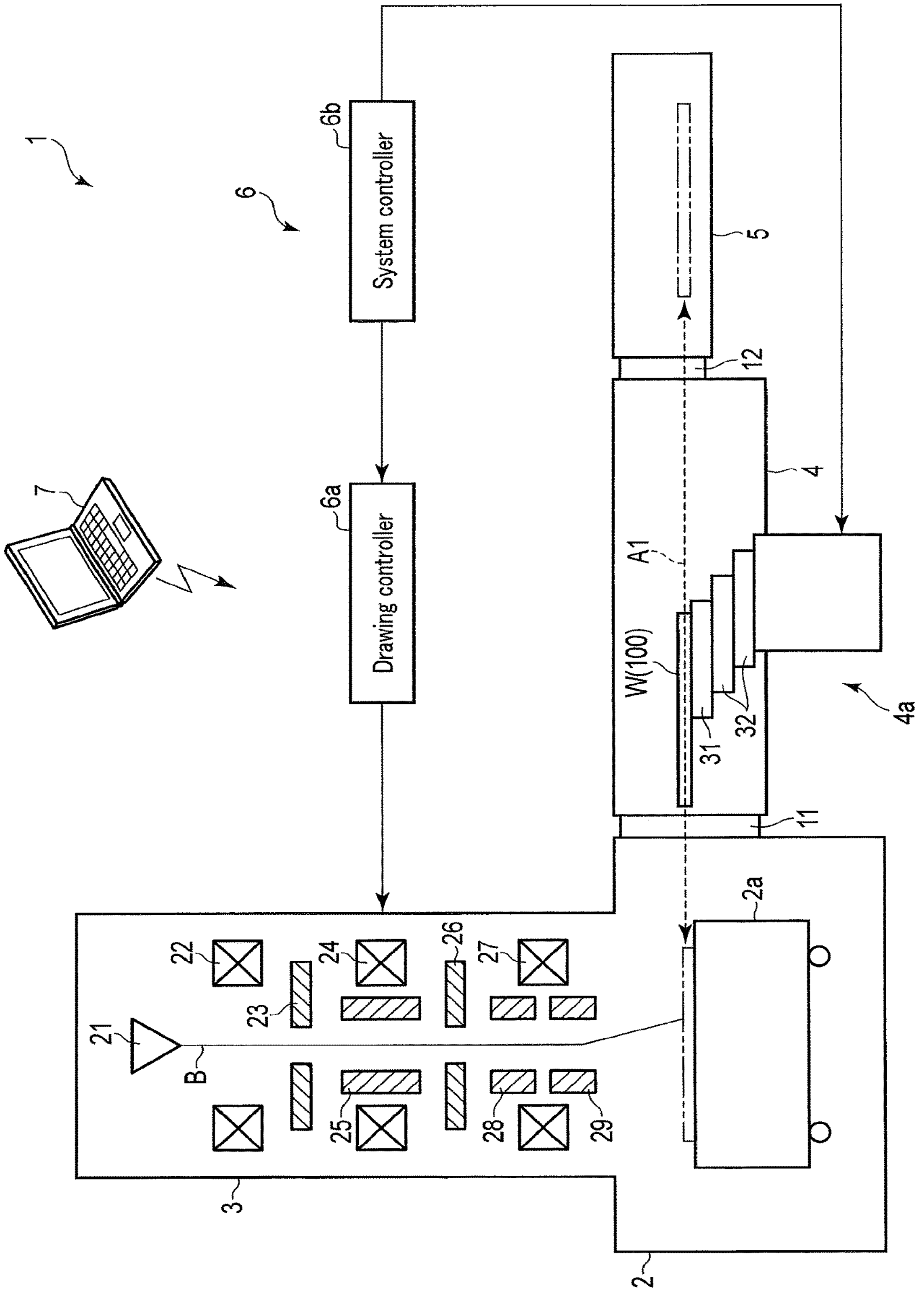
FIG. 10 is a view schematically illustrating a configuration of a charged particle beam drawing apparatus into which the dust-collecting apparatus according to the third embodiment is transferred.

Furthermore, as illustrated in FIG. 10, the dust-collecting apparatus 100 according to the third embodiment may operate in accordance with an instruction not from the electrification adjusting unit 6*c* of the charged particle beam drawing apparatus 1 but from an apparatus other than the apparatus of the target of cleaning, such as a personal computer 7. In this case, the dust-collecting apparatus 100 cleans the apparatus of the target of cleaning, based on instructions, information (e.g. vacuum degree), etc. from the personal computer 7 via the communication unit 128.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A dust-collecting apparatus comprising:

a main body with a first surface on which a back surface of a first electrode is disposed;

a fixing unit disposed on the first surface and configured to support a second surface opposed to the back surface of the first electrode;

a second electrode disposed on the first surface in a position opposed to the fixing unit and configured to support the second surface and to transfer a voltage to the first electrode; and a control board configured to control a magnitude and a timing of a voltage which is applied to the second electrode, wherein the fixing unit is configured to control attachment and detachment of the first electrode to and from the main body by moving along the first surface to press the first electrode to the second electrode.

2. The dust-collecting apparatus of claim 1, wherein the fixing unit includes:

a base portion disposed on the first surface of the main body; and a support portion connected to the base portion and configured to support the second surface of the first electrode, wherein the support portion is configured to control attachment and detachment of the first electrode to and from the main body by moving along the first surface and configured to press the first electrode to the second electrode.

3. The dust-collecting apparatus of claim 1, wherein the control board is configured:

to store setting information relating to the magnitude and the timing of the voltage which is applied to the second electrode; and to generate the voltage which is applied to the second electrode, based on a measured time instant and the setting information.

4. The dust-collecting apparatus of claim 1, further comprising a ground unit configured to be grounded to an apparatus of a target of cleaning, wherein the control board is configured to generate the voltage which is applied to the second electrode, based on a ground voltage of the apparatus of the target of cleaning, the ground voltage being transferred via the ground unit.

5. The dust-collecting apparatus of claim 1, further comprising a communication unit configured to receive a signal from an apparatus of a target of cleaning, wherein the control board is configured to generate the voltage which is applied to the second electrode, based on the signal received via the apparatus of the target of cleaning.

6. The dust-collecting apparatus of claim 1, wherein the control board is configured to monitor an electric current flowing in the second electrode, and configured to stop generation of the voltage which is applied to the second electrode, when the control board determines that an electric current over a predetermined value flows.

* * * * *